United States Patent [19]

Okusaku et al.

[11] Patent Number: 4,830,599
[45] Date of Patent: May 16, 1989

[54] MOLDING DEVICE FOR MOLDING SHEET

[75] Inventors: Takeshi Okusaku; Manabu Sakamoto; Hiroaki Kudo, all of Kanagawa, Japan

[73] Assignee: Ikeda Bussan Co., Ltd., Ayase, Japan

[21] Appl. No.: 67,887

[22] Filed: Jun. 30, 1987

[30] Foreign Application Priority Data

Sep. 24, 1986 [JP] Japan .................. 61-225205
Sep. 24, 1986 [JP] Japan .................. 61-225206

[51] Int. Cl.[4] .............................. B29D 9/00
[52] U.S. Cl. .............................. 425/521; 156/245; 425/225; 425/398; 425/408; 425/412
[58] Field of Search .............. 425/225, 346, 351, 384, 425/394, 397, 406, 407, 408, 412, 519, 520, 521, 555, 395, 396, 398, 400; 156/222, 224, 245, 494, 500

[56] References Cited

U.S. PATENT DOCUMENTS 2,255,116  9/1941  Helmstaedter .................. 425/394
2,270,187  1/1942  Dulmage ........................ 425/394
2,988,208  6/1961  Loew ............................ 206/56
4,143,587  3/1979  Fujii ........................... 425/408

FOREIGN PATENT DOCUMENTS

WO85/03488  8/1985  Int'l Pat. Institute.
2174638     8/1985  United Kingdom.

Primary Examiner—Jay H. Woo
Assistant Examiner—C. Scott Bushey
Attorney, Agent, or Firm—Foley & Lardner, Schwartz, Jeffery, Schwaab, Mack, Blumenthal & Evans

[57] ABSTRACT

A molding device for molding or shaping a plastically moldable sheet includes a lower mold having a recess which extends along an inner wall of the lower mold, an upper mold having a raised portion which is neatly received in the recess of the lower mold when the upper mold is properly seated on the lower mold to press the sheet, and a sheet mover including a rotatable member which is rotatably arranged on the outer wall of the lower mold and partially exposed to the recess of the lower mold.

14 Claims, 4 Drawing Sheets

MOLDING DEVICE FOR MOLDING SHEET

BACKGROUND OF THE INVENTION

1. Field of the Invention

The present invention relates in general to a molding device for molding a plastically moldable sheet, and more particularly, to a molding device of a type including lower and upper molds between and by which a plastically moldable sheet is pressed to form a shaped sheet member, such as a floor rug of a motor vehicle.

2. Description of the Prior Art

In order to clarify the task of the present invention, one conventional molding device of the above-mentioned type will be described with reference to FIGS. 11 and 12 of the accompanying drawings.

Referring to the drawings, there is shown a conventional molding device 100 which is designed to press a plastically moldable sheet 102 into a finished shaped sheet member, such as a floor rug of a motor vehicle. As is seen from FIG. 11, the molding device 100 comprises a stationary lower mold 104 and a movable upper mold 106. Each mold 104 or 106 installs therein a cooling device (not shown), such as a water flowing pipe or the like. The upper mold 106 is attached to a platen 108 of a hydraulic press (not shown). The lower mold 104 illustrated is formed with two elongate recesses 110 and 112 (each extending in a direction perpendicular to the surface on which FIG. 11 is carried) between and along which a ridge portion 114 extends, while, the upper mold 106 is formed with two ridge portions 116 and 118 (each extending in a direction perpendicular to the surface on which FIG. 11 is carried) between and along which an elongate recess 120 extends. That is, the work surfaces of the lower and upper molds 104 and 106 are so shaped or engraved as to match with each other. Due to the work of the hydraulic press, the upper mold 106 can be moved downward to press its engraved work surface against the counter work surface of the lower mold 104. Designated by numerals 104a and 106a are land areas provided by the lower and upper molds 104 and 106, which are mated with each other when the upper mold 106 is properly seated on the lower mold 104. The plastically moldable sheet 102 is of a sheet which comprises an upper layer 102a of cloth or the like and a lower layer 102b of thermoplastic impregnated felt or the like.

When molding of the plastically moldable sheet 102 is required, it is heated to a suitable temperature to be softened and then spread over between the lower and upper molds 104 and 106, respectively, as is seen from FIG. 11. For spreading the sheet 102, a spring-biased clamping device 122 is used by which laterally opposed sides of the sheet 102 are held and pulled outwardly as is shown by the arrows in FIG. 11. Then, the upper mold 106 is moved down and seated on the lower mold 104 to press the sheet 102 against the engraved work surface of the lower mold 104. Thereafter, the upper mold 106 is lifted to release the product, viz., the shaped sheet from the molding device 100.

However, as will be seen from FIG. 12, during the pressing work of the upper mold 106, the peripheral edge portions 116b and 118b of the ridges 116 and 118 of the upper mold 106 violently squeeze or press the sheet 102 against the outer walls of the recesses 110 and 112 of the lower mold 104 applying certain portions of the sheet 102 with considerable tension. This phenomenon sometimes induces formation of undesirable cracks at the tensioned portions of the sheet 102, particularly at the lower layer 102b of the same. Of course, such crack formation deteriorates the quality of the product.

SUMMARY OF THE INVENTION

It is therefore an object of the present invention to provide a molding device which is free of the above-mentioned drawback.

According to the present invention, there is provided, in a molding device of the type as mentioned hereinabove, a sheet mover by which the squeezing applied to the certain portions of the sheet is softened thereby applying generally no tension to the portions.

According to the present invention, there is provided a molding device for molding a plastically moldable sheet, which comprises a lower mold having a recess which extends along an outer wall of the lower mold, an upper mold having a raised portion which is neatly received in the recess of the lower mold when the upper mold is properly seated on the lower mold, and a sheet mover including a rotatable member which is rotatably arranged on the outer wall of the lower mold and partially exposed to the recess of the lower mold.

BRIEF DESCRIPTION OF THE DRAWINGS

Other objects and advantages of the present invention will become apparent from the following description when taken in conjunction with the accompanying drawings, in which.

DETAILED DESCRIPTION OF THE INVENTION

Figure 1:
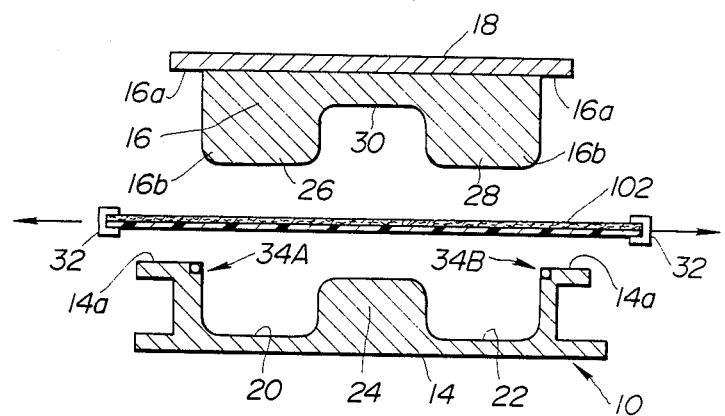
FIG. 1 is a sectional view of a molding device of a first embodiment of the present invention, showing a condition wherein a plastically moldable sheet is ready for being molded.

Referring to FIGS. 1 to 5, particularly FIG. 1, there is shown a molding device of a first embodiment of the present invention, which is generally designated by numeral 10.

The molding device 10, similar to the aforementioned conventional one, comprises a stationary lower mold 14 and a movable upper mold 16. Each mold installs therein a known cooling device (not shown). The upper mold 16 is fixed to a platen 18 of a hydraulic press (not shown). The lower mold 14 is formed with two elongate recesses 20 and 22 (each extending in a direction perpendicular to the surface on which FIG. 1 is carried) between and along which a ridge portion 24 extends, while, the upper mold 16 is formed with two ridge portions 26 and 28 (each extending in a direction perpendicular to the surface on which FIG. 1 is carried) between and along which an elongate recess 30 extends. The lower and upper molds 14 and 16 have respective land areas 14a and 16a which are mated with each other when the upper mold 16 is properly seated on the lower mold 14. A spring-biased clamping device 32 is provided for spreading a plastically moldable sheet 102 between the lower and upper molds 14 and 16.

Designated by numerals 34A and 34B are sheet movers which are employed in the invention for smoothly moving peripheral portions of the sheet 102 into the recesses 20 and 22 of the lower mold 14 during pressing work of the upper mold 16 against the sheet 102 on the lower mold 14. The sheet movers 34A and 34B are respectively arranged on the upper edge portions of the respective outer walls of the recesses 20 and 22 of the lower mold 14, as is seen from FIG. 1. That is, each sheet mover 34A or 34B is arranged to extend along the elongate recess 20 or 22, as may be understood from FIG. 7 which however shows a third embodiment of the invention.

Since the two sheet movers 34A and 34B are substantially the same in construction, only the sheet mover 34B will be described in detail in the following with reference to FIGS. 2, 3 and 4.

Figure 2:
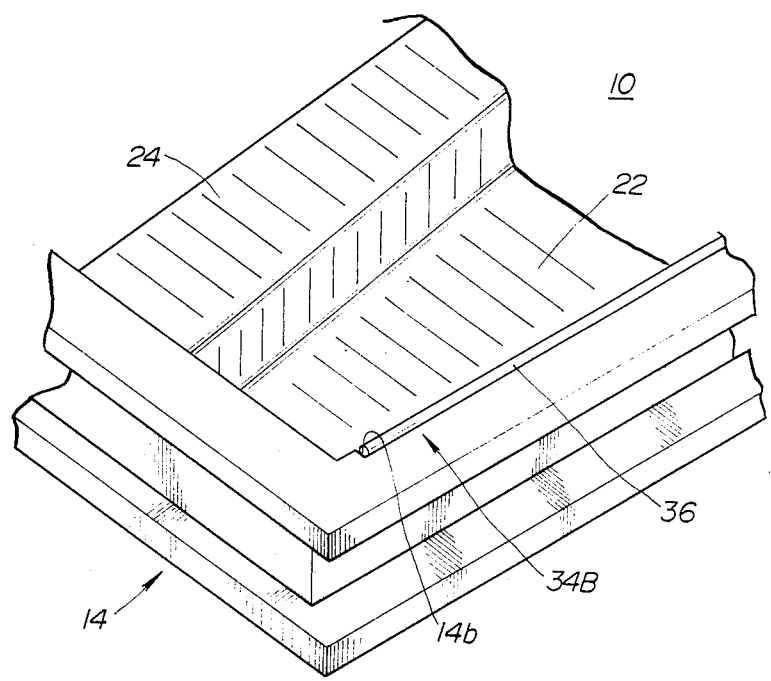
FIG. 2 is a perspective but partial view of a lower mold of the molding device of the first embodiment, showing an essential part of the molding device.
Figure 3:
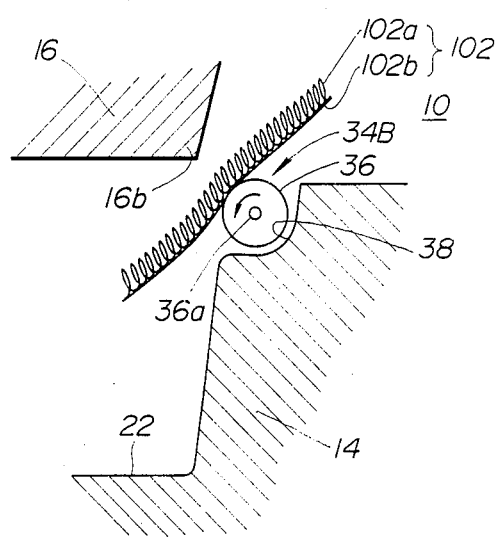
FIG. 3 is a sectional view of the essential part of the molding device of the first embodiment with the plastically moldable sheet practically applied thereto.
Figure 4:
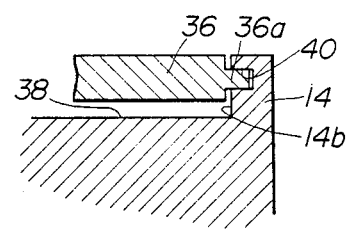
FIG. 4 is a sectional but partial view of a sheet mover employed in the molding device of the first embodiment.
Figure 5:
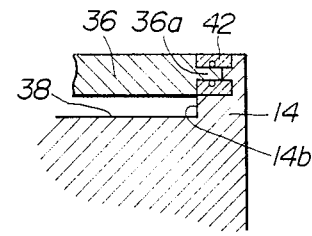
FIG. 5 is a view similar to FIG. 4, but showing a modified sheet mover.

As is seen from FIGS. 2 and 3, the sheet mover 34B comprises an elongate roller bar 36 which is rotatably received in an elongate groove 38 formed on the upper edge portion of the outer wall of the recess 22 of the lower mold 14. The groove 38 extends along the axis of the elongate recess 22 and has both ends defined by vertical walls 14b located near the axial ends of the elongate recess 22, as may be understood from FIG. 7. As may be seen from FIG. 4, the roller bar 36 has diametrically reduced ends 36a (only one is shown) each being rotatably received in a bore 40 formed at the vertical wall 14b of the lower mold 14. With this arrangement, the roller bar 36 is freely rotatable about its axis which is in parallel with the longitudinal axis of the elongate recess 22 of the lower mold 14. If desired, as is seen from FIG. 5, a known bearing 42 may be set in each bore 40 for smoothing the rotation of the roller bar 36 relative to the lower mold 14. Furthermore, if desired, the roller bar 36 may be fixed to the outer wall of the lower mold 14 to serve as a stationary shaft and an elongate coil spring (not shown) may be freely rotatably disposed about the fixed shaft. Furthermore, in place of the coil spring, a plurality of rings (not shown) may be rotatably disposed about the fixed shaft. These arrangements will be understood from FIGS. 8 and 9.

When molding of the sheet 102 is required, it is heated to a suitable temperature and then spreaded over between the lower and upper molds 14 and 16 by the clamping device 32, as is seen from FIG. 1. Then, the upper mold 16 is moved down and finally seated on the lower mold 14. As is seen from FIG. 3, during the downward movement of the upper mold 16, the peripheral edge portions 16b of the engraved work surface of the upper mold 16 contact and pull certain peripheral portions of the sheet 102 toward the recess 22 of the lower mold 14 for the reason as is described in the part of the conventional molding device 100. It is however to be noted that according to the invention, the downward movement of sheet 102 caused by the lowering upper mold 16 induces a rotation of the roller bar 36 generating substantially no tension in the certain portions of the sheet 102. Thus, unlike in the case of the conventional molding device 100, undesirable cracks are not produced in the product, viz., the finished shaped sheet, or at least minimized.

Figure 6:
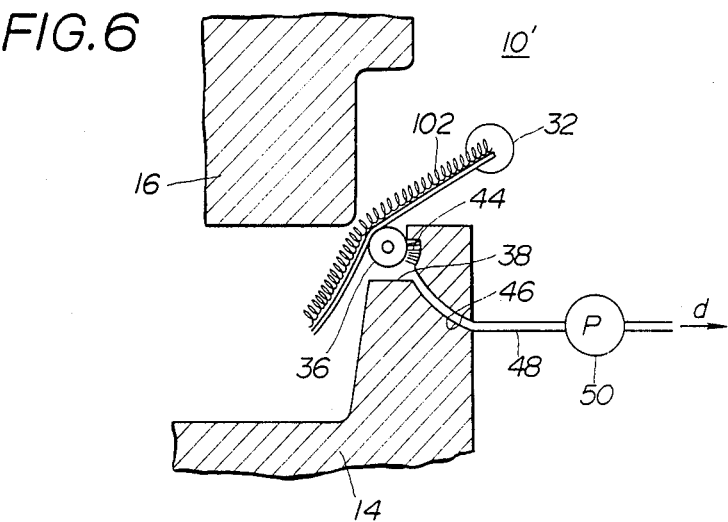
FIG. 6 is a view similar to FIG. 3, but showing a second embodiment of the present invention.

Referring to FIG. 6, there is shown a second embodiment of the present invention, which is generally designated by numeral 10'. The molding device 10' of this second embodiment is substantially the same as the afore-mentioned first embodiment 10 except for an aftermentioned portion. Thus, substantially the same parts as those of the first embodiment 10 are denoted by the same numerals and detailed explanation of them will be omitted from the following description.

That is, in the second embodiment 10', there is employed a roller bar cleaner for each sheet mover 34A or 34B. As is seen from the drawing, viz., FIG. 6, the roller bar cleaner comprises an elongate brush 44 which is fixed to the outer wall of the lower mold 14 and extends along the roller bar 36 while contacting with the roller bar 36. Thus, upon rotation of the roller bar 36, the cylindrical outer surface of the same is continuously brushed. A passage 46 is formed in the outer wall of the lower mold 14, which extends from the elongate groove 38 for the roller bar 36 to the outer surface of the wall to be exposed to the open air. A tube 48 extending from an air suction pump 50 is connected to the passage 46. Thus, upon energization of the air pump 50, air is forced to flow in the tube 48 in the direction of the arrow "d" of the drawing.

In the second embodiment 10' as described hereinabove, any dust attached to the cylindrical outer surface of the roller bar 36 can be removed by the brush 44 and discharged through the passage 46 and the tube 48 by the work of the air suction pump 50.

Figure 7:
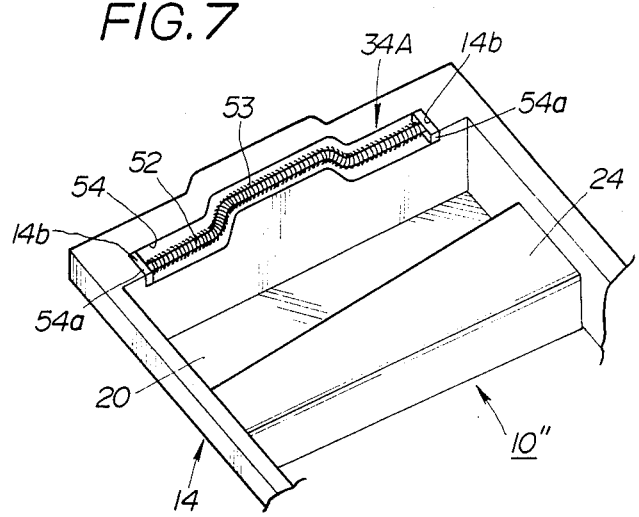
FIG. 7 is a perspective but partial view of a lower mold of a third embodiment, showing an essential part of the third embodiment.
Figure 8:
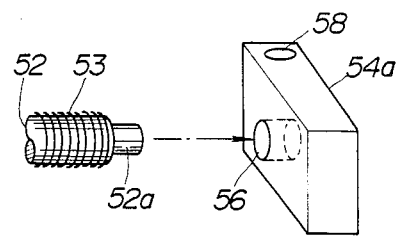
FIG. 8 is an exploded view of a sheet mover employed in the third embodiment of the present invention.
Figure 10:
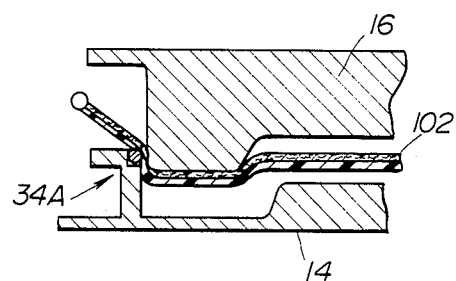
FIG. 10 is a sectional but partial view of the molding device of the third embodiment in a condition wherein a plastically moldable sheet is being pressed.
Figure 11:
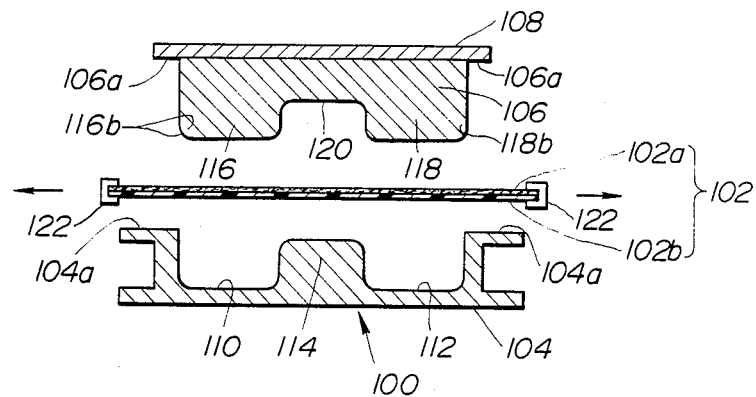
FIG. 11 is a sectional view of a conventional molding device in a condition wherein a plastically moldable sheet is ready for being molded by the device.
Figure 12:
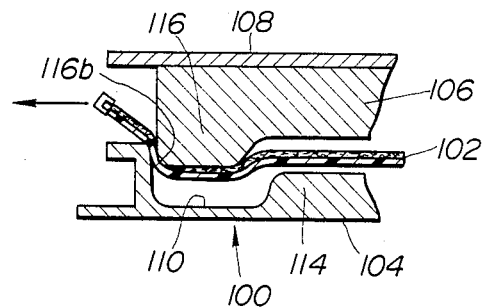
FIG. 12 is a sectional but partial view of the conventional molding device in a condition wherein the plastically moldable sheet is being pressed.

Referring to FIGS. 7, 8 and 10, particularly FIG. 7, there is shown a third embodiment of the present invention, which is generally designated by numeral 10".

Each sheet mover 34A (only one is shown) of this embodiment comprises an elongate shaft 52 which is curved and shaped to match with the shape of the upper portion of the outer wall of the elongate recess 20 of the lower mold 14. An elongate coil spring 53 is freely rotatably disposed about the shaft 52. The shaft 52 having the coil spring 53 disposed thereabout is spacedly received in a correspondingly shaped groove 54 formed on the upper edge portion of the outer wall of the recess 20. That is, the groove 54 extends substantially along the axis of the elongate recess 20 and has both ends defined by vertical walls 14b which are located near the axis ends of the recess 20, as is seen from FIG. 7. Both ends of the shaft 52 are connected to the vertical walls 14b of the groove 54 through respective holders 54a which are bolted to the lower mold 14. As is seen from FIG. 8, each holder 54a has a bore 56 into which a diametrically reduced end 52a of the shaft 52 is snugly inserted. The holder 54a has further a threaded bore 58 into which a fastening bolt (not shown) is screwed to fasten the end 52a of the shaft 52 to the holder 54a.

Because of the flexibility of the elongate coil spring 53, it is permitted to freely rotate about the shaft 52 even when the latter is somewhat bent. Thus, as is seen from FIG. 10, the downward movement of the sheet 102 caused by the lowering upper mold 16 can induce a rotation of the coil spring 53, like in the case of the afore-mentioned embodiments 10 and 10'.

Figure 9:
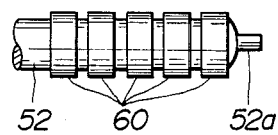
FIG. 9 is a side but partial view of a modified sheet mover employable in the third embodiment.

Referring to FIG. 9, there is shown a modification of the sheet mover for the third embodiment 10''. That is, in this modification, a plurality of spaced rings 60 are rotatably disposed about the fixed shaft 52 in place of the elongate coil spring 53. In this case, ball bearings are preferably used for achieving smooth rotation of the rings 60 relative to the shaft 52. Each ring 60 may be constructed of metal, plastics.

It should be understood that the embodiments of the present invention which have been described are merely illustrative of an application of the principles of the present invention. Numerous modifications beside the disclosed ones may be made by those skilled in the art without departing from the true spirit and scope of the invention.

What is claimed is:

1. A molding device for molding a plastically moldable sheet, comprising:
   a lower mold having a recess which extends along an inner wall of the lower mold;
   an upper mold having a raised portion which is neatly received in the recess of said lower mold when said upper mold is properly seated on said lower mold;
   a sheet mover including a rotatable member which is rotatably arranged on the inner wall of the lower mold and partially exposed to the recess of the lower mold;
   said rotatable member being an elongate roller bar having a cylindrical outer surface which extends along an upper edge portion of the inner wall of the lower mold and is rotatable about its axis;
   the axis of said elongate roller bar being substantially in parallel with the longitudinal axis of said recess of the lower mold; and
   said elongate roller bar being spacedly received in an elongate groove which is formed on the upper edge portion of said inner wall, said elongate groove having both ends defined by vertical walls formed by said inner wall of said lower mold.

2. A molding device as claimed in claim 1, in which said elongate roller bar has diametrically reduced ends each being rotatably received in a bore formed in one of said vertical walls.

3. A molding device as claimed in claim 2, in which each of said ends of the elongate roller bar is received in said bore through a bearing.

4. A molding device as claimed in claim 1, further comprising a spring-biased sheet clamping device which, when said upper mold is lifted up from said lower mold, secures said plastically moldable sheet between said upper and lower molds.

5. A molding device as claimed in claim 1, in which said sheet mover comprises:
   an elongate shaft extending along an upper portion of said inner wall of said lower mold leaving a given space therebetween and securely connected at its ends to said inner wall; and
   at least one rotatable structure which is rotatably disposed about said elongate shaft and partially exposed to the recess of said lower mold.

6. A molding device as claimed in claim 5, in which said elongate shaft is correspondingly shaped in order to match with the shape of said upper portion of said inner wall.

7. A molding device as claimed in claim 6, wherein said elongate shaft is spacedly received in a correspondingly shaped groove formed on the upper portion of said inner wall, said groove having ends which are defined by vertical walls defined by said inner wall.

8. A molding device as claimed in claim 7, in which each end of said elongate shaft is connected to one of said vertical walls through a holder which is bolted to said inner wall, said holder having a bore into which said end of the shaft is snugly received.

9. A molding device for molding a plastically moldable sheet, comprising:
   a lower mold having a recess which extends along an inner wall of the lower mold;
   an upper mold having a raised portion which is neatly received in the recess of said lower mold when said upper mold is properly seated on said lower mold;
   a sheet mover including a rotatable member which is rotatably arranged on the inner wall of the lower mold and partially exposed to the recess of the lower mold;
   said rotatable member being an elongate roller bar having a cylindrical outer surface which extends along an upper edge portion of the inner wall of the lower mold and is rotatable about its axis;
   the axis of said elongate roller bar being substantially in parallel with the longitudinal axis of said recess of the lower mold;
   said elongate roller bar being spacedly received in an elongate groove which is formed on the upper edge portion of said inner wall, said elongate groove having both ends defined by vertical walls formed by said inner wall of said lower mold; and
   a roller bar cleaner for brushing the cylindrical outer surface of said roller bar when said roller bar is rotated.

10. A molding device as claimed in claim 9, in which said roller bar cleaner comprises:
    an elongate brush which extends along the roller bar and is fixed to the inner wall of the lower mold;
    a passage formed in said inner wall and having one end open to a clearance to which said roller bar is exposed and the other end exposed to open air; and
    an air suction pump connected through a tube to the other end of said passage.

11. A molding device for molding a plastically moldable sheet, comprising:
    a lower mold having a recess which extends along an inner wall of the lower mold;
    an upper mold having a raised portion which is neatly received in the recess of said lower mold when said upper mold is properly seated on said lower mold;
    a sheet mover including a rotatable member which is rotatably arranged on the inner wall of the lower mold and partially exposed to the recess of the lower mold, said sheet mover comprising an elongate shaft extending along an upper portion of said inner wall of said lower mold leaving a given space therebetween and securely connected at its ends to said inner wall, and at least one rotatable structure which is rotatably disposed about said elongate shaft and partially exposed to the recess of said lower mold;

said elongate shaft being correspondingly shaped in order to match with the shape of said upper portion of said inner wall;

said elongate shaft being spacedly received in a correspondingly shaped groove formed on the upper portion of said inner wall, said groove having ends which are defined by vertical walls defined by said inner wall;

each end of said elongate shaft being connected to one of said vertical walls through a holder which is bolted to said inner wall, said holder having a bore into which said end of the shaft is snugly received; and said holder having a threaded bore into which a fastening bolt is screwed to tightly fasten said end of the shaft to said holder.

12. A molding device for molding a plastically moldable sheet, comprising:

a lower mold having a recess which extends along an inner wall of the lower mold;

an upper mold having a raised portion which is neatly received in the recess of said lower mold when said upper mold is properly seated on said lower mold;

a sheet mover including a rotatable member which is rotatably arranged on the inner wall of the lower mold and partially exposed to the recess of the lower mold, said sheet mover comprising an elongate shaft extending along an upper portion of said inner wall of said lower mold leaving a given space therebetween and securely connected at its ends to said inner wall, and at least one rotatable structure which is rotatably disposed about said elongate shaft and partially exposed to the recess of said lower mold;

said elongate shaft being correspondingly shaped in order to match with the shape of said upper portion of said inner wall; and said rotatable structure being an elongate coil spring.

13. A molding device as claimed in claim 12, in which said rotatable structure comprises a plurality of spaced rings which are rotatably disposed about said shaft.

14. A molding device as claimed in claim 13, in which each of said rings is made of metal or rigid plastics.

* * * * *